(12) United States Patent
Frederiksen

(10) Patent No.: US 6,718,588 B1
(45) Date of Patent: Apr. 13, 2004

(54) RAMP CONSTRUCTION AND ELEMENTS THEREFOR

(75) Inventor: Ole Frederiksen, Mørke (DK)

(73) Assignee: Excellent Systems A/S, Mørke (DK)

(*) Notice: Subject to any disclaimer, the term of this patent is extended or adjusted under 35 U.S.C. 154(b) by 0 days.

(21) Appl. No.: 10/019,622
(22) PCT Filed: Jul. 3, 2000
(86) PCT No.: PCT/DK00/00362
§ 371 (c)(1), (2), (4) Date: Mar. 12, 2002
(87) PCT Pub. No.: WO01/02667
PCT Pub. Date: Jan. 11, 2001

(30) Foreign Application Priority Data

Jul. 2, 1999 (DK) .......................... 1999 00965

(51) Int. Cl.[7] ............................................. E01C 15/20
(52) U.S. Cl. ............................ 14/69.5; 404/35; 404/40
(58) Field of Search .............................. 52/656.2, 656.4; 414/921; 14/69.5; 404/31, 35, 40

(56) References Cited

U.S. PATENT DOCUMENTS

| 3,153,798 A | * | 10/1964 | Drevtison | 14/69.5 |
|---|---|---|---|---|
| 3,500,606 A | * | 3/1970 | Wharmby | 52/591.1 |
| 4,577,448 A | * | 3/1986 | Howorth | 52/584.1 |
| 4,671,699 A | * | 6/1987 | Roach | 404/41 |
| 4,697,294 A | * | 10/1987 | Schafer | 14/69.5 |
| 4,817,224 A | * | 4/1989 | Visnaw et al. | 14/69.5 |
| 4,819,910 A | * | 4/1989 | Johnston | 254/88 |
| 5,341,533 A |  | 8/1994 | Seitz | |
| 5,403,637 A | * | 4/1995 | Pickard et al. | 428/44 |
| 5,446,937 A |  | 9/1995 | Haskins | |
| 5,509,244 A | * | 4/1996 | Bentzon | 52/387 |
| 5,640,821 A |  | 6/1997 | Koch | |
| 5,777,266 A |  | 7/1998 | Herman et al. | |
| 5,865,004 A | * | 2/1999 | Mitchell | 52/582.1 |
| 5,901,395 A |  | 5/1999 | Vander Heiden et al. | |
| 6,179,545 B1 | * | 1/2001 | Petersen, Jr. et al. | 414/537 |

FOREIGN PATENT DOCUMENTS

GB 2240801 8/1991

* cited by examiner

Primary Examiner—Thomas B. Will
Assistant Examiner—Raymond W. Addie
(74) Attorney, Agent, or Firm—James Creighton Wray; Meera P. Narasimhan

(57) ABSTRACT

For facilitating the passage of wheelchair users over door thresholds it is known to lay out ramp elements across the threshold, this however being an expensive solution even implying that the door cannot be closed. The invention provides for a ramp set suited to be laid out at both sides of the threshold so as to leave the top side thereof uncovered, whereby the door can still be opened and closed. The ramp construction is modular based on the use of light, joinable plastic tile elements of ordinary shape and wedge shape, respectively, and this makes it possible to build up non-costly, tailored ramp constructions in more general, with an associated possibility of reusing the tile elements.

11 Claims, 2 Drawing Sheets

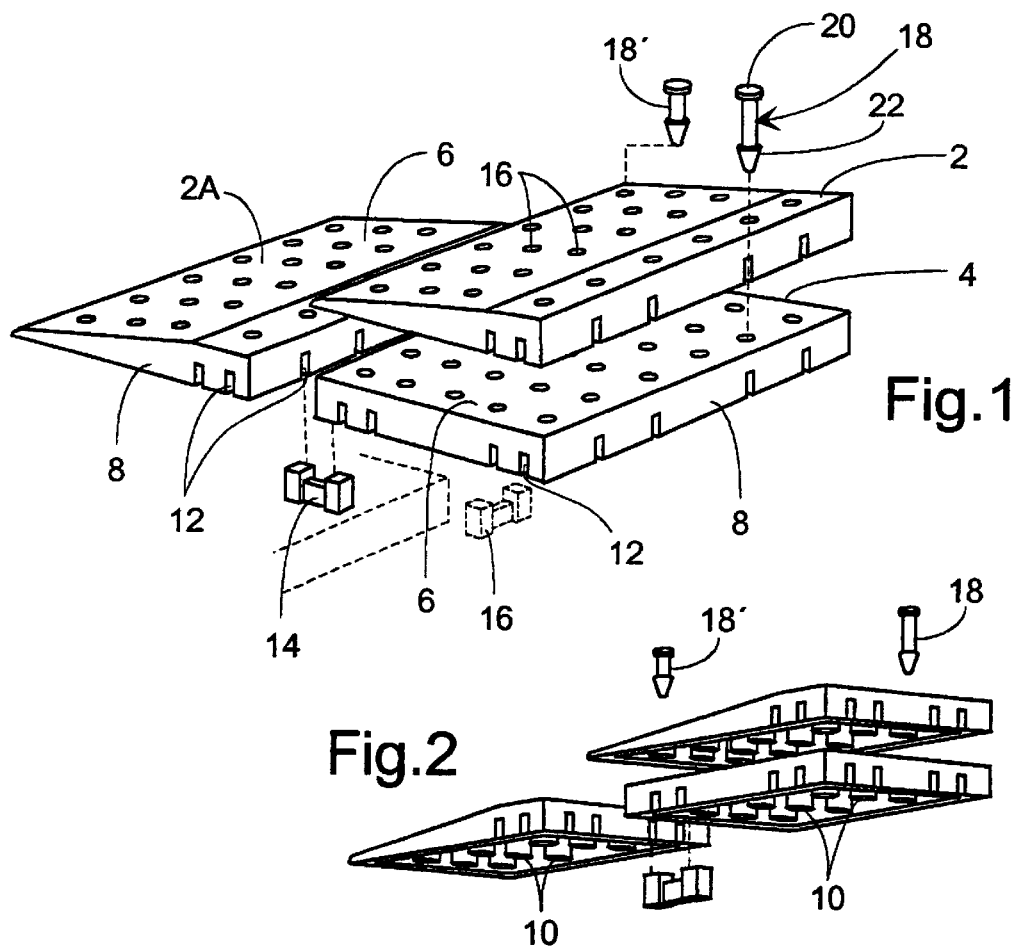
Fig.1
Fig.2
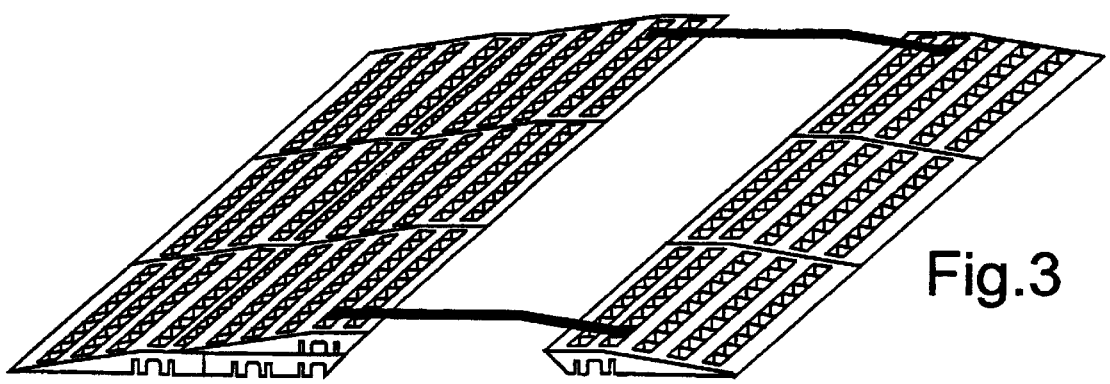
Fig.3
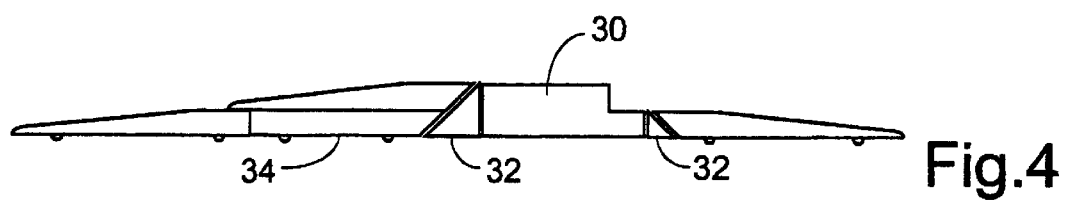
Fig.4

RAMP CONSTRUCTION AND ELEMENTS THEREFOR

BACKGROUND OF THE INVENTION

The present invention concerns equipment for easing the passage of wheelchair users through abrupt differences in level such as when traversing over door thresholds. It is well-known that a quite big problem arises herewith, which hitherto has been accommodated either by the removal of the thresholds or by covering them with a suitably arched metal plate. None of these solutions are ideal, in that the closing function of the door at the bottom is partly or completely annulled, in that in the latter case the door cannot even be closed, and moreover both solutions are relatively expensive.

SUMMARY OF THE INVENTION

With the invention it has been found that the greatest hindrances for an easy passage is the increase in level at the opposing edge surfaces of a normal door threshold, while the actual rabbet which receives the door has so small a depth that its vertically upright edge can normally be forced without problems. While it is true that the said outer edge surfaces are normally covered with a triangular floor list, the outer surface part of this is so steeply upright that for the wheel of a wheelchair it still constitutes a "high edge". In light of this, with the invention it has been found to be sufficient to make use of two mutually separated ramp elements which, with suitably differing greatest heights, can respectively abut in against the high and the low outer edge of the door threshold, and from here extend out with suitable slightly inclined surfaces to enable the traversing over a door threshold to be effected in a trouble-free manner. It is also hereby achieved that the door will be able to be closed in a completely normal way.

In buildings which in advance are laid out for use by persons in wheelchairs, this can manifest itself in simple, permanent ramp arrangements, but the object of the invention is directed to a special degree towards more or less provisional modifications of normal, existing door thresholds, which will distinguish itself by the use of loose ramp pieces. This can be relevant e.g. in such cases where an operation patient can be sent home from the hospital for a temporary period in a wheelchair while undergoing rehabilitation. In practice, here it can be experienced that the patient must be retained at the hospital for up to several weeks while waiting for a carpenter to remove the thresholds in the patient's home which, all things considered, is a very costly solution.

However, the invention goes a step further by giving the wheelchair users themselves or with the assistance of a helper, the possibility of carrying out the laying-out of relevant ramp elements in connection with visits to places where only conventional door thresholds exist, in that said ramp elements are carried by the wheelchair users. In each passage of such a threshold, the ramp elements can be laid out and taken up again after the threshold has been traversed, so that they can be reused in the next passage. Particularly in connection with such an application, use can possibly be made of the principle that only the relevant ramp part for traversing upwards can be laid out, in that a smaller "traversing downwards bump" can probably be acceptable. It is obvious that it is hereby especially a traversing upwards to the high side of the threshold which calls for the use of a ramp.

With more lasting arrangements, such as in the home of the user, it will be undesirable for the formation of gaps to arise between the ramp elements and the edges of the thresholds as a consequence of the said customary floor lists, and even though these lists can undoubtedly be removed more simply than the thresholds as a whole, according to the invention such a removal can, however, be completely avoided, in that the high end of each ramp element facing towards the threshold is cut off at an angle in such a manner that the floor list can be accommodated in this cut-off, so that work with a tight abutment can be carried out without removal of the floor list.

In semi-permanent installations, it is easy to fasten the ramp elements to the threshold or the floor surfaces, and a certain fastening is naturally necessary to counteract the displacement of the elements by accidental influences. In temporary arrangements, according to the invention it is an attractive possibility that two opposing ramp elements can be fastened, in that they are mutually connected with elastic strip parts in such a manner that they will automatically be clamped together in against the opposing edges of the door threshold. They can thus still easily be displaced, but they will seek back to their normal position of their own accord. The elastic strip parts can merely pass over the threshold, where there will be room for them even when the door is closed, and they will automatically bring the ramp parts into correct abutment against the sides of the threshold, regardless of the breadth of the threshold.

The above will apply to ramp parts in general, but it will be obvious that not least where the "portable" ramp parts are concerned, it will be desirable for these to exist in cheap, lightweight configurations. According to the invention, advantage can hereby be taken of the fact that modular systems of floor covering tiles of plastic materials with a thin top side part have already been developed, and which are supported against the floor by means of downwardly-extending edge side parts and evenly distributed pin parts, cf. e.g. U.S. Pat. No. 5,509,204, especially FIG. 7. The tiles are mutually coupled together by means of edge assembly elements, and they constitute decidedly lightweight units which, however, can tolerate considerable compressive loads. These floor coverings appear with different distinct advantages for a certain height above the floor, and associated, sloping "ramp tiles" have already been proposed as edging parts for these coverings. With the invention it has been found that these ramp tiles are directly suitable for the purpose under consideration here, in that e.g. they can be used directly as coupled-together elements at the low side of the threshold, while at the high side of this they can be supported by normal floor-tile elements, e.g. fastened hereto with simple screw connections. In this manner, flat, sloping-out ramp elements can be built up for any relevant height with suitable module constructions.

The invention can also find relevant application in connections other than just the passage of wheelchairs over a conventional door threshold, e.g. by such a passage out on to a balcony, the surface of which following regulations lies lower than the existing floor level. By means of the said special floor tiles, there can hereby even be built up a raised floor on the balcony, as this will not, after all, change the orientation of the water-tight balcony floor. It can hereby possibly be sufficient to make use of a ramp piece at the internal side of the threshold of the balcony door. A quite corresponding arrangement can be used in shower cabinets.

The ramp pieces for loose application can expediently be configured with friction studs on the under side, so that in the loaded condition they will lie in an extra stable manner.

A wheelchair can expediently be configured with means for easily-releasable securing of a set of ramp pieces, e.g. behind the backrest, or a smaller number of sets can be carried in a case, possibly hanging at the rear, so that the user can be equipped to neutralise several door thresholds, e.g. during stays at hotels or when spending week-ends in conventional surroundings. Moreover, it will thus be relevant in such cases e.g. for the hotels themselves to have a suitable number of ramp sets at disposal for laying out in hotel rooms as required.

Relevant ramp constructions can be related to differences in level which are considerably greater than at door thresholds, e.g. as transition between floor level and a front door which is otherwise accessible via a normal flight of steps of greater or smaller height. Here, even temporary ramp constructions can be extremely expensive, and with known configurations they will most often be without any special value from the point of view of reuse. The equipment according to the invention will be highly suitable for practically any relevant ramp construction, merely providing that the necessary number of module elements are available, which in a simple manner can be joined together to create a stable structure with tailor-made form. Correspondingly, the elements will easily be able to be separated for subsequent reuse in new structures. Not only can the original structure be carried out relatively cheaply, but also the economy in the system is emphasized even further by the possible reusability of the ramp and tiles elements.

In the following, the invention is explained in more detail with reference to the drawing, in which

BRIEF DESCRIPTION OF THE DRAWINGS

FIG. 1 is a perspective view, seen from above, of a ramp element with an underlying tile and ramp element for use in a construction according to the invention, FIG. 2 is the same seen from below, FIG. 3 is a perspective view of the ramp equipment for application in connection with a door threshold, FIG. 4 is an end view hereof, shown in the mounted condition.

DETAILED DESCRIPTION OF THE PREFERRED EMBODIMENTS

Figure 5:
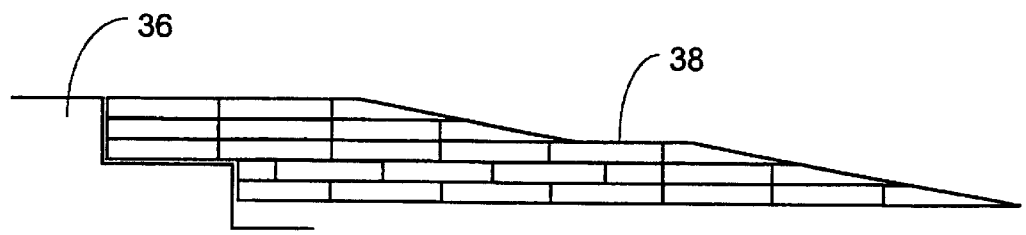
FIG. 5 is a sectional view of a larger ramp construction.

In FIG. 1 is shown an overlying ramp element 2 placed over an underlying tile element 4 which is in turn connected horizontally to a corresponding ramp element 2A. Both the ramp elements and the tile elements are configured in accordance with U.S. Pat. No. 5,509,244, i.e. as shell elements with top-plate part 6 from which edge wall parts 8 extend downwards and cylindrical support studs 10 (FIG. 2). The edge wall parts 8 are configured with cut-outs 12 to accommodate assembly coupling pieces 14, by means of which the elements can be joined together edge to edge. The top plates 6 are configured with a pattern of holes 16, and as accessories there are assembly dowels 18 with a head part 20 and a lower snap-lock part 22, which when the dowel is pressed downwards will enter into locking connection with the corresponding hole 16 in the underlying tile 4. Such dowels exist in two different lengths, i.e. long dowels 18 for the fastening the thick end of the ramp element, and short dowels 18' for the thin end of the element.

To the left in FIG. 3 the elements cf. FIGS. 1 and 2 are shown in their assembled state and joined together with further, corresponding elements in the breadth direction, whereby a ramp part 24 is formed which is suitable for placing against the right-hand side of a door threshold. To the right is shown a second ramp piece 26 which consists solely of coupled-together ramp elements 2 for placing against the low side of the threshold. The pieces 24 and 26 are connected together by means of elastic strips 28 which will hold the pieces in against the threshold, cf. FIG. 4.

In FIG. 4 it is shown that the threshold 30 can be provided with lists 32, and that the high ends of the ramp pieces can be cut off at an angle in such a manner that it will not be necessary to remove the lists. It is also shown that the elements can be provided with rubber studs 34, e.g. fastened in the cylindrical pins 10.

As shown in the drawing, it is preferred that the ramp elements 2 have an outermost plane area at their high ends, so that a fastening to an overlying element can be effected in a plane manner. Moreover, it is preferred that the ramp elements are slightly longer than the tile elements, so that the thin end projects slightly outside an underlying assembly joint so that the joint is shielded.

Figure 6:
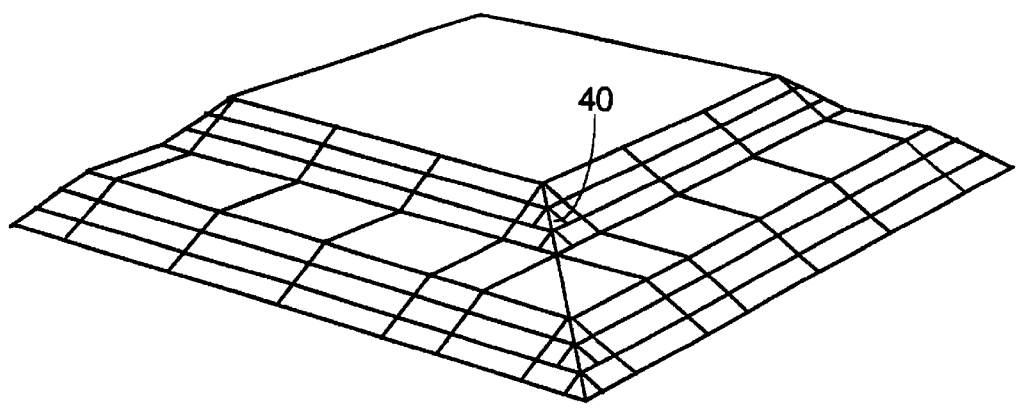
FIG. 6 is a perspective view of a double ramp.

In FIG. 5 there is shown a part of a larger ramp construction, e.g. with connection to a flight of steps 36. It will be seen that the ramp can be tailor-made with one or more landings 38. FIG. 6 shows a double ramp which is similarly configured with a landing. It is also shown that special corner elements 40 can be provided for terminating the outer corners in such a construction. Correspondingly, corner elements can be provided for use in internal corners, in that it will be understood that ramps with all possible configurations can be built up both outdoors and indoors.

Instead of the assembly dowels 18, use can be made of simple screw connections so that the ramp can be dismantled directly after a period of use. It can also possibly be broken up, if this is permitted by the dowels 18, but these are preferably configured in such a strong locking manner that they should instead be removed by a quickly executed drilling through of the head parts 20. The dismantling can be effected without any damage to the elements themselves, and these will thus be ready for reuse in other places.

The elements are relatively easy to process with hand tools, so that well-fitting ramp constructions can be achieved by the cutting over of some of the elements. Such element parts can possibly be stored in a central depot, e.g. sorted in accordance with size. However, since the elements are relatively inexpensive, it can be preferred that methodical use is made of new elements.

What is claimed is:

1. Equipment comprising a number of modular elements for easing the passage of wheelchair users through abrupt differences in level by use of the driving ramp principle, wherein the equipment comprises plural first and second types of elements for modular construction of ramp formations, the first type of elements being a relatively low, wedge-shaped ramp elements with inclined upper surfaces, wherein the inclined surfaces are about 10–20° to horizontal and wherein greatest heights of the first type of elements is about 10–50 mm, and the second types of elements being a flat tile elements having same heights as the greatest heights of the first type of elements, and further wherein the first and second types of elements are configured as shell elements with top plates having patterns of holes having side walls extending downwards from edges of the top plates and having numbers of support studs provided on and extending downward from undersides of the top plates, and further comprising connectors having head parts and lock parts for connecting vertically aligned holes of two or more elements of either the first type and/or the second type superimposed on top of each other by inserting the connectors through the aligned holes of the superimposed elements.

2. Equipment according to claim 1, wherein the first type of elements are for placing against a low side of a door threshold and is configured with a standard size, wherein the first type of elements are also used at a high side of the threshold with the first type of elements supported by the second type of elements extending outwards in relation to the threshold with the corresponding first type of elements, such that tops of the first type of elements are on opposite sides of the threshold and together form a substantially continuous ramp surfaces.

3. Equipment according to claim 2, wherein two ramp parts at the opposite sides of the threshold are connected with a tractive connection between them in the form of a strip or band extending across the threshold for holding the ramp parts against the opposite sides of the threshold, and for allowing for a total closing of the door.

4. Equipment according to claim 2, wherein one side or both sides of the threshold has steeply-angled sides, wherein ends of the ramp parts abut against the sides of the threshold and are configured with edges cut off at steep angles for accommodating the steeply angled sides of the threshold.

5. Equipment according to claim 2, wherein floor-engaging surfaces of the support studs are provided with friction-promoting parts.

6. Equipment according to claim 2, where the top plates of the shell elements are configured with patterns of the holes, and wherein the connectors further comprise snap-lock couplings for vertical fixing of the superimposed elements to underlying elements by pressing the snap-lock couplings down through the aligned holes.

7. Equipment according to claim 1, wherein the connectors are of at least two different lengths forming longer connectors and shorter connectors, wherein the longer connectors are adapted for a connecting the flat tile elements and thicker ends of the ramp elements, and wherein the shorter connectors are adapted for connecting thinner ends of the ramp elements with the flat tile elements.

8. Equipment according to claim 7, wherein at the thicker ends of the ramp elements are provided with horizontal surfaces.

9. Equipment according to claim 8, wherein along longitudinal dimensions of the ramp elements are slightly longer than corresponding longitudinal dimensions of the flat tile elements for overlying the horizontal surfaces of adjacent lamp elements.

10. Equipment for easing the passage of wheelchair users through abrupt differences in level, e.g. over door thresholds, by use of the driving ramp principle, wherein the equipment comprises element parts for the module construction of ramp formations, primarily relatively low, wedge-shaped ramp elements with suitable slightly inclined upper side, such as with a wedge-angle of 10–20° and preferably with a greatest height of 10–50 mm, and secondary flat tile elements of the same height as the greatest height of the associated ramp elements, wherein both the ramp elements and the flat tile elements are structurally of the type which are built up as shell elements with a top shell from which edge wall parts extend downwards, and support shell parts with edge wall parts which are configured with recesses for the accommodation of assembly coupling pieces, wherein the top shells are configured with a pattern of through-going holes, wherein equipment comprises coupling pieces for the vertical fixing of elements to underlying elements by the pressing of snap-lock coupling pieces down through respectively associated holes, and wherein the vertically coupling connectors have at least two different lengths, the connectors further comprising "long" pieces for connecting the flat tile elements with thicker ends of the ramp elements, and "short" pieces for connecting thinner ends of the ramp elements with the flat tile elements.

11. Equipment for easing the passage of wheelchair users through abrupt differences in level, e.g. over door thresholds, by use of the driving ramp principle, wherein the equipment comprises element parts for the module construction of ramp formations, primarily relatively low, wedge-shaped ramp elements with suitable slightly inclined upper side, such as with a wedge-angle of 10–20° and preferably with a greatest height of 10–50 mm, and secondary flat tile elements of the same height as the greatest height of the associated ramp elements, wherein at their thick ends the ramp elements have thicker and thinner ends, the thicker ends having outer sections with flat horizontal surfaces, wherein in longitudinal directions of ramp structures, the ramp elements are slightly longer than the flat tile elements, and wherein the thinner ends of the ramp elements overlie the outer sections of next adjacent ones of the ramp elements.

* * * * *